Oct. 21, 1952     G. CAMISA ET AL     2,614,610
AMBULATORY COMMODE VEHICLE

Filed June 12, 1950     2 SHEETS—SHEET 1

INVENTORS
GEORGE CAMISA
GEORGE E. HECKER
BY
ATTORNEY

Oct. 21, 1952  G. CAMISA ET AL  2,614,610
AMBULATORY COMMODE VEHICLE

Filed June 12, 1950  2 SHEETS—SHEET 2

INVENTORS
GEORGE CAMISA
GEORGE E. HECKER
BY
ATTORNEY

Patented Oct. 21, 1952

2,614,610

UNITED STATES PATENT OFFICE 2,614,610

AMBULATORY COMMODE VEHICLE

George Camisa and George E. Hecker, Brooklyn, N. Y.; said Hecker assignor to said Camisa Application June 12, 1950, Serial No. 167,507

1 Claim. (Cl. 155—31)

Our invention relates to that class of ambulatory commode vehicles by which bed-ridden patients, or such like patients, can be moved temporarily from their respective beds and onto the seat of said ambulatory vehicle and in comfortable position thereon, said seat being adjustably raised or lowered in anticipation of said moving of the patient, with respect to the height of the seat, and also in placing the vehicle in parallel position relative to the bed of the patient.

The patient having been seated as stated on said seat of the vehicle, said vehicle is wheeled to a lavatory or like location where said vehicle is then moved contiguous to the toilet bowl therein, and in such a manner that the seat of said vehicle is positioned directly over said toilet bowl. Such position of said vehicle locates said toilet bowl between the two side walls of said vehicle.

An object of our invention is to provide an ambulatory commode vehicle, comparatively simple in construction, yet having adjusting means whereby the seat of said vehicle may be moved vertically in either direction so that the patient may be easily moved from the bed and comfortably seated on said vehicle, and whereupon said seat may be lowered when said vehicle is positioned over the toilet bowl as already explained.

A further object of the invention is in the arrangement of the various parts and materials required, making the vehicle easy to manufacture and at reasonable cost.

Other objects will be apparent during the course of the following detailed description.

In the accompanying drawing, forming a part of this specification, and wherein similar reference characters designate corresponding parts throughout the several views.

Figure 6:
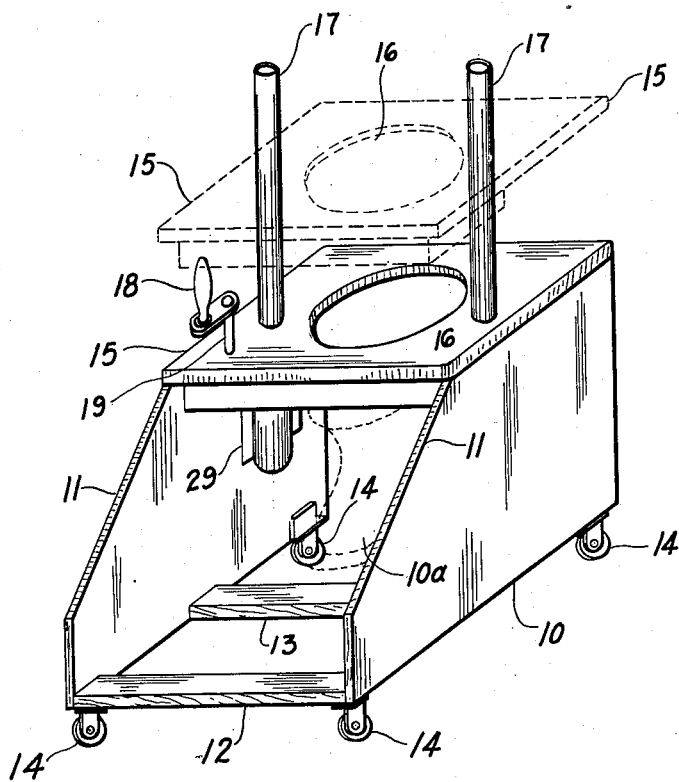
Fig. 6 is a perspective view of the ambulatory commode vehicle in position over a toilet bowl and showing in dotted line the manner of raising or lowering the seat thereof above said vehicle base.

Referring to the drawing wherein, for purposes of illustration, is shown a preferred embodiment of our invention, the numeral 10 indicates as a whole, the ambulatory commode vehicle, said vehicle 10 being provided with roller wheels 14 which permit the vehicle to be freely rolled forwardly and rearwardly, said wheels also preventing lateral shifting movement of the vehicle. The side walls 11 of said vehicle are held together substantially by the cross-pieces 12 and 13. These cross-pieces are placed in the front section of said vehicle thus allowing sufficient clearance to permit said vehicle 10 to be backed in, and in position relative to the seat of said vehicle 10 and to the toilet bowl 10a, the latter being seen in dotted line in Fig. 6.

The seat 15 is moved vertically above the base portion of said vehicle in either direction by the turning of the handle 18. Said handle is attached to the lever 18a, and said lever in turn is attached to the shaft 19. Integral to the shaft 19 is driving pulley wheel 21, the latter having two grooves around the periphery thereof. One of said grooves contains the looped pulley cord 23 which is movably engaged thereon, said cord 23 extending over the pulley wheel 20, the latter wheel having a groove on its periphery to receive said pulley cord 23. The second groove of driving pulley wheel 21 has engaged thereon the looped pulley cord 22, said cord extending over the driven pulley wheel 21a in the groove thereon. Said pulley wheel 21a is provided with a second groove on its periphery in which the pulley cord 23a is placed and which extends over the driven pulley wheel 20a in the groove thereof.

Figure 1:
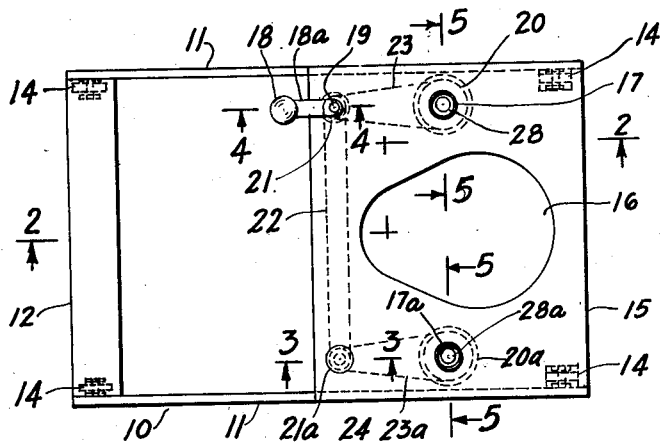
Fig. 1 is a plan view of the ambulatory commode vehicle showing the seat thereof, said seat having the usual type of opening.
Figure 3:
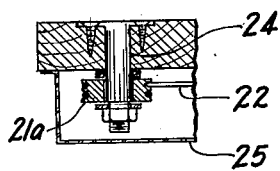
Fig. 3 is a detail section of a double grooved pulley wheel on the line 3—3 of Fig. 1.
Figure 4:
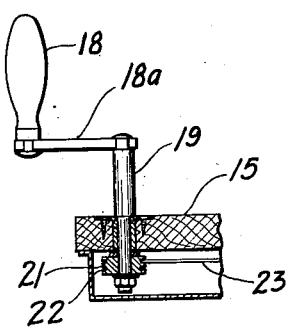
Fig. 4 is a detail of a handle for manually rotating said pulley wheel, said detail on the line 4—4 of Fig. 1.
Figure 5:
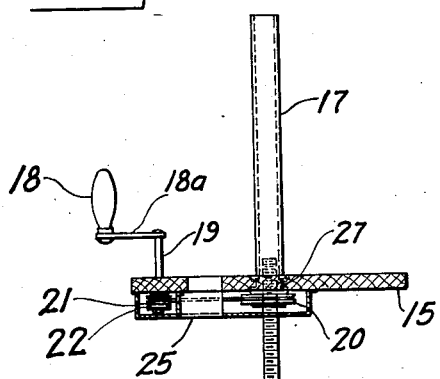
Fig. 5 shows a detail of a lead screw shaft, said detail on the line 5—5 of Fig. 1.
Figure 5:
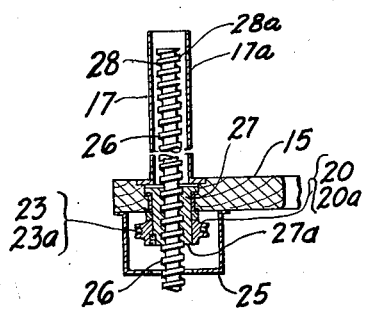
Figure 2:
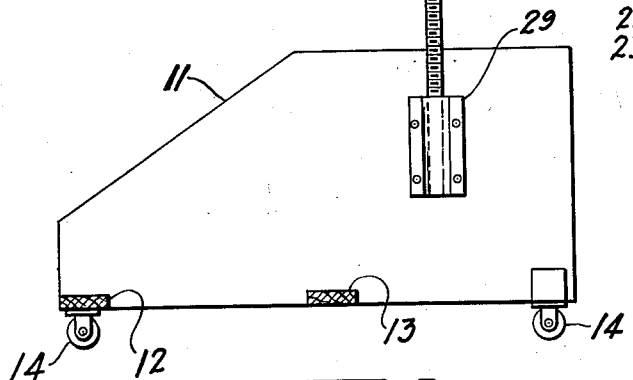
Fig. 2 is a side elevation of said commode vehicle on the line 2—2 of Fig. 1.

Integral to the pulley wheel 20, which is positioned underneath the seat 15 as shown in Fig. 2, is a bushing 27 fitted in a bored hole through said seat 15. A similar bushing is provided for the wheel 20a. The wheel 20 has an inner thread which meshes with the outer thread of bushings 27 and 27a. The inner thread of bushings 27 and 27a meshes with the shaft thread 26. Lead screw shaft 28 is contained within a casing 17, said casing being attached to the seat 15 as seen in Fig. 2. A companion lead screw shaft 28a is mounted opposite to that of the shaft 28, and is likewise housed within the casing 17a. Said lead screws 28 and 28a and the casings or coverings thereof are situated respectively at each side of the toilet opening of said seat structure 15, said casings in said relative positions forming handholds thereby enabling a patient needed support while seated on said seat structure 15. The driven pulley wheel 20a, like the wheel 20, engages with the screw threads of the shaft 28a.

The casings 17 and 17a also function as hand holds for the patient while being moved from the bed to the lavatory or like retiring place.

25 is the housing to enclose the underneath rotating wheels and the pulley cords connected therewith.

The following is a description of the operation of the pulley wheels and pulley cords in connection therewith for the vertical lifting and lowering of the seat 15.

When the handle 18 is turned, the driving wheel 21 likewise turns, being attached to the shaft 19 and the latter to the wheel 21. The turning of the wheel 21 in turn moves the pulley cord 23, thereby causing the wheel 20 to revolve. Similarly, the turning of the handle 18 and the driving wheel 21 integral thereto will cause the wheel 21a to rotate through the medium of the pulley cord 22, which in turn will cause the wheel 20a to rotate through the medium of the pulley cord 23a. Thus the rotation of the wheels 20 and 20a on the shafts 28 and 28a, respectively, and underneath the seat 15, will cause said seat structure to raise or lower above said vehicle base in accordance with the rotation of the handle 18, as already explained.

It is obvious that various modifications are possible in our invention from that described in this specification without departing from the spirit thereof. For instance, the wheels and pulley cords connected thereto may be substituted by gears and connecting shafts, or other methods may be employed to manually raise and lower the seat of the vehicle.

Now, having described our invention, what we claim is:

In a device of the class described, a wheeled base comprising a pair of spaced side walls and means connecting said side walls at forward and center portions thereof to provide an unobstructed opening between the rear portions of said side walls, a seat spanning said side walls and having a toilet aperture therein, means adjustably supporting said seat for vertical movement over said rear portions, said supporting means including a vertical lead screw rotatably mounted on each side wall and fixed against axial movement relative thereto, and internally threaded bushings rotatably mounted on and extending through said seat, each bushing threadedly receiving one of said screws, means mounted on said seat for rotating said bushings in unison and a pair of elongated tubular housings, each housing fixed to and extending upwardly from said seat in axial alignment with a cooperating bushing and screw, said housings enclosing portions of corresponding screws which extend above said seat.

GEORGE CAMISA.
GEORGE E. HECKER.

REFERENCES CITED

The following references are of record in the file of this patent:

UNITED STATES PATENTS

| Number | Name | Date |
| --- | --- | --- |
| 1,094,117 | Butler | Apr. 21, 1914 |
| 1,730,252 | Temple | Oct. 1, 1929 |
| 1,973,962 | Mueller | Sept. 18, 1934 |
| 2,322,683 | Costa et al. | June 22, 1943 |
| 2,509,551 | Woods | May 30, 1950 |
| 2,513,444 | Barnes | July 4, 1950 |
| 2,578,382 | Thompson | Dec. 11, 1951 |